United States Patent [19]

Roberts et al.

[11] 4,441,476
[45] Apr. 10, 1984

[54] CHARGE AIR COOLING SYSTEM

[76] Inventors: James E. Roberts, 1345 Roycroft Ave., Long Beach, Calif. 90804; Edward L. Lenarth, 7036 Schroll Ave., Lakewood, Calif. 90713

[21] Appl. No.: 439,116

[22] Filed: Nov. 4, 1982

[51] Int. Cl.³ ............................................. F02D 19/00
[52] U.S. Cl. .................................... 123/542; 123/540; 123/563; 123/25 R; 60/599
[58] Field of Search ............. 123/540, 563, 539, 25 R, 123/25 E, 25 J, 541, 542; 60/599

[56] References Cited

U.S. PATENT DOCUMENTS

| 3,441,011 | 4/1969 | Karl | 123/542 |
| 3,528,225 | 9/1970 | Manfredi | 123/25 R |
| 3,991,724 | 11/1976 | Geiser | 123/25 R |
| 4,014,179 | 3/1977 | Iles | 123/563 |
| 4,180,032 | 12/1979 | Plegat | 123/563 |

Primary Examiner—Ronald H. Lazarus
Attorney, Agent, or Firm—William C. Babcock

[57] ABSTRACT

A charge air cooling assembly in which water pressurized by air at reduced pressure from the air brake system of a vehicle powered by a two or four cycle Diesel engine is discharged intermittently as a spray into the intake or discharge of a turbo-compressor, in response to the demand pressure on the intake manifold of an engine to lower the rate of fuel consumption of the latter and increase the torque and power output of the engine.

4 Claims, 2 Drawing Figures

CHARGE AIR COOLING SYSTEM

BACKGROUND OF THE INVENTION

1. Field of the Invention

Charge air cooling system

2. Description of the Prior Art

For many years it has been realized that when air in the after flow of a turbo-compressor is cooled the operating effeciency of a two or four cycle Diesel engine is increased. Such cooling has been attained by utilizing heat exchangers that employed either air flow or engine coolant fluid.

Although air flow has been employed in the past on automotive vehicles for this purpose, it has the operational disadvantage that the equipment required is bulky and cumbersome, is expensive to install and requires substantial maintenance.

Cooling of air from the turbo-compressor using the engine coolant fluid does allow the use of equipment that is relatively small, but such equipment must be incorporated in the original engine design, is costly, and must periodically be replaced. In addition, using engine coolant fluid, limits cooling of air from the turbo-compressor to 175° to 190° Fahrenheit.

A major object of the present invention is to provide a charge air cooling system that overcomes the major operational disadvantage of prior art devices of this nature, in that, it is less expensive to install and maintain, has a low consumption of water, and requires no water pump.

Another object of the invention is to supply one that operates only intermittently in response to the demand need of the engine, keeps the engine clean, and minimizes the build up of hard carbon in the engine.

A still further object of the invention is to supply one that is operated by air at reduced pressure from the air brake system of a vehicle, and one that visually indicates to the driver of a vehicle both that the invention is operative and that water is being injected into air prior to the latter flowing to the intake manifold.

These and other objects and advantages of the invention will become apparent from the following description of a preferred form thereof.

SUMMARY OF THE INVENTION

The invention includes a normally open pressure responsive electrical switch that is operatively associated with the intake manifold on a Diesel two or four cycle engine and closes only when the demand pressure in the manifold rises above the predetermined magnitude.

A water reservoir is provided that has the interior pressurized by air at reduced pressure from the air brake system of a vehicle. The reservoir has a water discharge line extending therefrom to the inlet of a normally closed solenoid operated valve. A water discharge line extends from the solenoid operated valve to a nozzle located in the ambient air inlet of a turbo-compressor, which compressor has the discharge therefrom connected to the intake manifold of the engine.

An electrical circuit is provided that is energized by the battery of the vehicle and includes an on-off switch, a first signal light which when illuminated indicates that the invention is operative, and a second signal light which when illuminated indicates that water is being discharged from the nozzle to air entering the turbo-compressor. The second signal light is illuminated as a result of the demand pressure in the air manifold being exceeded, with the pressure responsive electrical switch assuming a closed position to complete the electric circuit to the solenoid operated valve. The solenoid valve then moved to an open position to allow the air pressure in the reservoir to force water to the nozzle, from which it is discharged as a spray into air flowing to the intake manifold. The finely divided droplets of water in the spray tend to evaporate, and in so doing the latent heat required for such evaporation is removed from the air with which the droplets are intermixed, and the air being cooled as a result thereof. Upon the demand pressure in the intake manifold falling below a predetermined magnitude, the pressure responsive electrical switch opens, and the spring loaded solenoid operated valve assumes a closed position to terminate flow of pressure water to the nozzle.

DESCRIPTION OF THE PREFERRED EMBODIMENT

Figure 1:
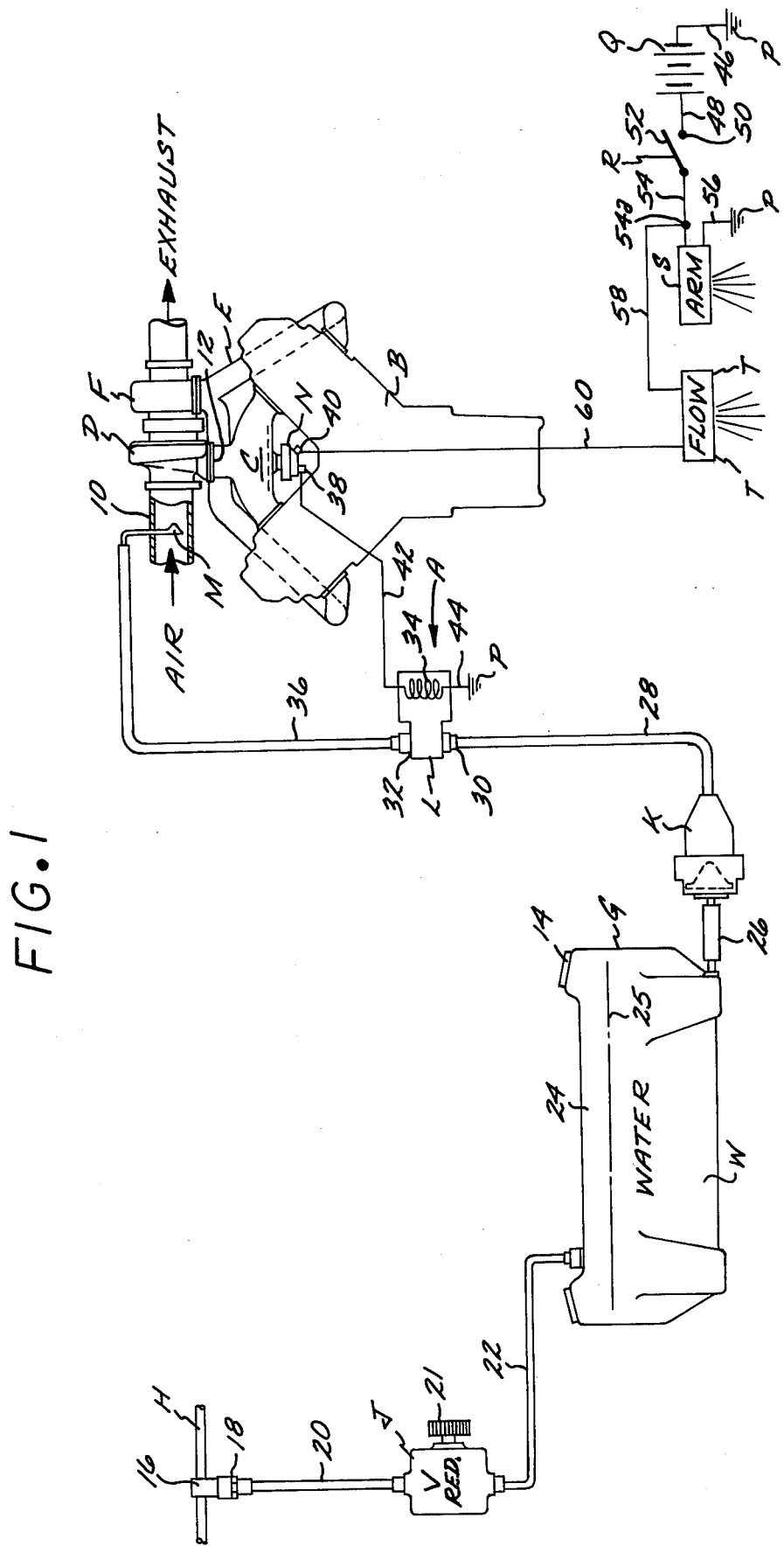
FIG. 1 is a schematic drawing of the invention.

The charge air cooling system A of the present invention is used on a Diesel two or four cycle internal combustion engine B as may be seen in FIG. 1. The engine B includes an air intake manifold C. A compressor D is driven by a turbine F. The compressor D has a tubular air intake 10 and an air discharge 12 that is in communication with the manifold C. The turbine F is driven by exhaust from the engine B that flows thereto through a manifold E.

A water reservoir G is provided that has a removable closure 14 mounted thereon, which closure is removed when the reservoir is being filled with water. An air brake line H of the vehicle (not shown) on which the charge air cooling system A is mounted has a fitting 16 therein that communicates with a check valve 18 that is connected to a conduit 20 as shown in FIG. 1.

The conduit 20 is connected to a pressure reducing valve J that has an adjustment knob 21 as a part thereof. The air discharge from the pressure reducing valve J flows through a conduit 22 that extends to the reservoir G and is in communication with the upper portion of the interior 24 thereof. The reservoir G is substantially filled with water W as shown by the level 25 in FIG. 1.

A conduit 26 extends from the lower portion of the reservoir G and is in communication with a filter K, and filtered pressurized water discharging from the filter through a conduit 28. The conduit 28 is connected to the inlet 30 of a spring loaded, normally closed, solenoid operated valve L, which valve has a discharge 32. The valve L includes a solenoid coil 34.

A conduit 36 extends from the discharge 32 of valve L to the interior of the air intake 10 of compressor D, where the conduit terminates in a water injector nozzle M.

A normally open, pressure responsive, electrical switch N is provided that is operatively associated with the air intake manifold C. The electrical switch N has first and second terminals 38 and 40. The first terminal 38 is connected by an electrical conductor 42 to one terminal of the solenoid coil 34, with the other terminal of the coil being connected to ground P by a conductor 44.

The vehicle (not shown) on which the engine B is mounted includes a battery Q that has a first conductor 46 extending therefrom to ground P. A second conductor 48 extends from the battery Q to a contact 50 of a manually operated switch R, which switch includes a blade 52. The blade 52 has a conductor 54 extending therefrom to one terminal of a first signal light S and the other terminal of the signal light being connected by a conductor 56 to ground P. An electrical conductor 58 extends from a junction point 54a in conductor 54 to a first terminal of a second signal light T, with the second terminal of the signal light being connected to an electrical conductor 60 that extends to the second terminal 40 of the pressure responsive electrical switch N.

The charge air cooling system A above described operates intermittently, and only then when the driver of the vehicle (not shown) on which it is installed manually moves the switch R to the closed position. Closing of the switch R results in an electric circuit being completed from the battery Q to the first signal light S. Illumination of the first signal light S indicates to a driver of the vehicle (not shown) that the system A is armed.

The pressure responsive electrical switch N remains in the closed position until the pressure in the intake manifold C exceeds a predetermined magnitude, which is the demand pressure. When the demand pressure is reached, the electrical switch N closes. Closing of the switch N results in the second signal light T being illuminated to indicate to a driver that water is being injected into air from the ambient atmosphere as it is drawn through the inlet 10 to compressor D.

When switch N is closed electric power flows from junction point 54a, through conductor 58, signal light T, conductor 60, switch N, conductor 42, solenoid coil 34, conductor 44 to ground P. Energization of solenoid coil 34 results in valve L assuming an open position, with pressurized water from reservoir G flowing through conduits 28 and 36 to the injector nozzle M. Water as it discharges from nozzle M intermixes with air from the ambient atmosphere flowing through inlet 10 to cool the air. Cooling of the air flowing to the compressor is due to evaporation of the droplets of water, and the heat for accomplishing the same being withdrawn from the incoming air.

Upon the pressure in the intake manifold falling below the demand pressure, the switch N automatically assumes an open position to interrupt the electric circuit to solenoid operated valve L. The valve L is spring loaded and assumes a closed position upon the breaking of the electrical circuit thereto. Due to the water W being pressurized at all times by air from the air brake line H, the invention A operates without the use of a water pump.

The switch R and the first and second signal lights S and T are preferably mounted on the cab display panel of the vehicle (not shown) of which the engine B is a part.

In the conventional operation of the compressor D, the temperature of the compressed air will normally rise to 325° to 400° F. This increase in temperature results in the density of the heated air being lowered, and as a result there is insufficient oxygen available therein to effect a complete oxidation of the fuel. By operating the invention A to respond to a substantially low demand pressure, the air charge may be lowered from 325° to 125° F., with a substantial increase in the density of the air charge. This increase in density results in an increase in the amount of oxygen available for oxidation of the fuel, and as a result the engine is maintained in a clean condition with a minimum build up of hard carbon within the interior thereof.

Figure 2:
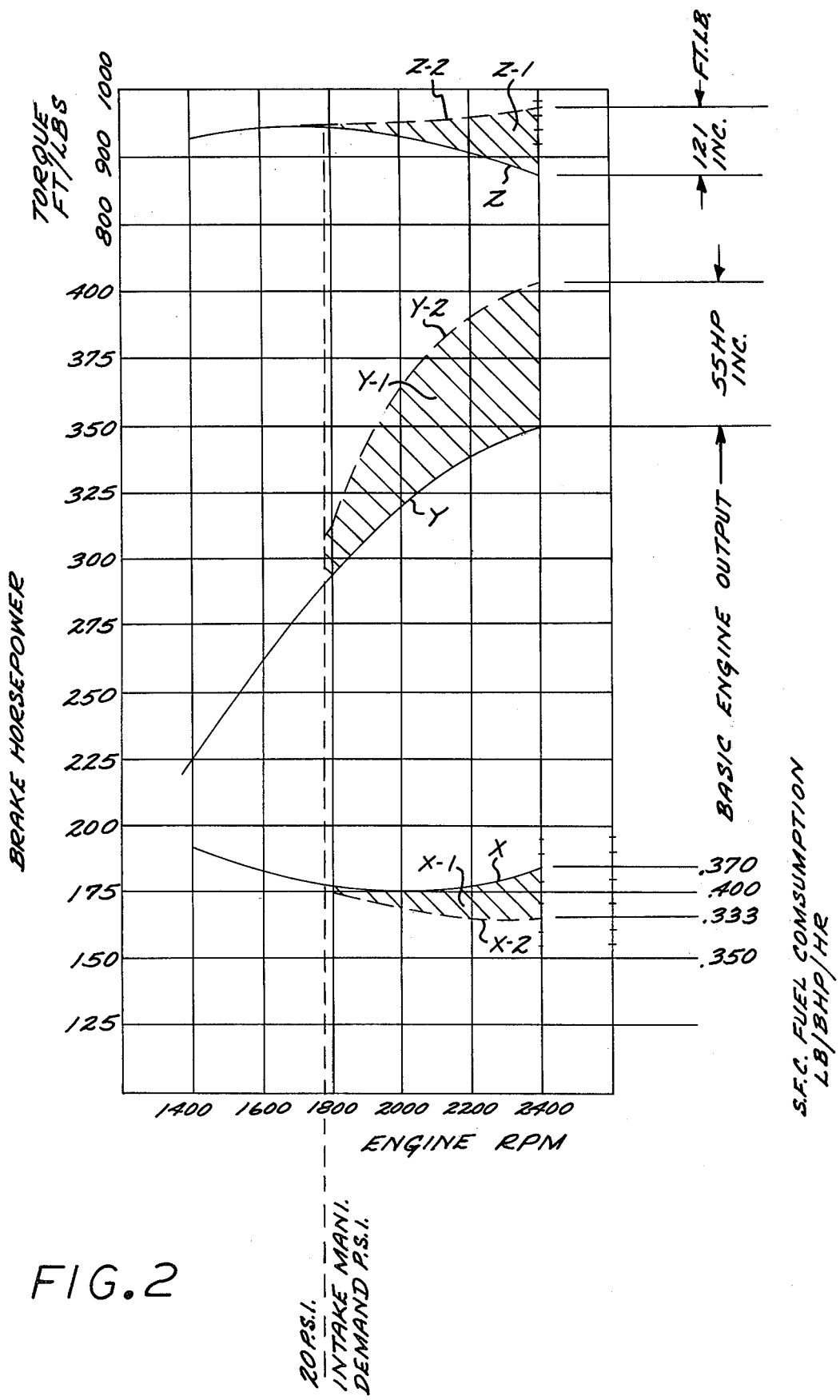
FIG. 2 are performance curves of an engine operating with and without water injection.

The operational advantages achieved when the invention A is used to lower the temperature of the compressed air to 125° F. are shown by the curves and shaded areas illustrated in FIG. 2. In FIG. 2 it will be seen that curve X in solid line that illustrates the rate of fuel consumption moves through the shaded area X-1 towards the curve X-2 shown in phantom line when the temperature of the compressed air is lowered from 325° to 125° F.

Under like conditions the curve Y that illustrates brake horse power moves through the shaded area Y-1 to the curve Y-2 shown in phantom line. The torque curve Z likewise moves through the shaded area Z-1 to the curve Z-2 illustrated in phantom line.

Although the charge air cooling system A has been described in conjunction with an automotive vehicle having an air brake system, it will be apparent that the system may be adapted to stationary engines that utilize a turbine driven compressor.

In the invention as described the pressurized air in the brake system will be at approximately 100 p.s.i, with the check valve 18 set to open at a pressure of 80 p.s.i. The valve J will preferably be set to reduce the air pressure to 4 to 5 p.s.i. The pressure responsive switch N is adjustable to close at a desired pressure which will be a function of the specific engine turbo pressure ratio.

The use and operation of the invention has been described previously in detail and need not be repeated.

What is claimed is:

1. In an automotive vehicle powered by an internal combustion engine that has a turbine driven compressor that withdraws air from the ambient atmosphere and discharges said air at an elevated pressure to an intake manifold, said vehicle including a pressurized air actuated brake system and a battery, the improvement for intermittently increasing the density of air flowing to said intake manifold by cooling the same, said improvement comprising:
  a. a reservoir that defines a confined space for storing water, said reservoir having a water outlet;
  b. a normally closed, spring loaded, solenoid operated valve that has an inlet and an outlet;
  c. a normally open pressure switch responsive to the pressure in said intake manifold, said switch closing when a predetermined pressure is reached in said intake manifold;
  d. first means for pressuring said confined space with air from said air brake system to force pressurized water from said outlet;
  e. second means for injecting pressurized water from said reservoir into air from said compressor prior to said air flowing to said intake manifold;
  f. conduit means that connect said water outlet to said inlet of said solenoid operated valve and said outlet of said solenoid operated valve to said second means; and
  g. an electrical circuit connected to said battery, said electrical circuit including said pressure switch and solenoid operated valve, said pressure switch when said predetermined pressure is reached assuming a closed position to electrically energize said solenoid operated valve to move to an open position whereupon pressurized water flows to said second means to cool said air flowing to said intake manifold, with said flow of pressurized water continuing only so long as the pressure in said intake manifold is at least said predetermined pressure.

2. The improvement as defined in claim 1, which in addition includes:

h. a manually operated switch and first and second signal lights that are a part of said electrical circuit, said manually operated valve when closed causing said first signal light to be illuminated to visually indicate said improvement is operative, and said second signal light when illuminated indicating said solenoid operated valve is in an open position with pressurized water flowing to said second means.

3. The improvement as defined in claim 1 in which said first means includes:

h. a pressure reducing valve having an inlet and an outlet;

i. a first conduit in communication with said air brake system and said inlet to said pressure reducing valve; and j. a second conduit connected to said outlet of said pressure reducing valve and in communication with an upper portion of said confined space.

4. The improvement as defined in claim 1 in which said compressor includes a tubular air inlet and said second means includes:

h. an injector nozzle in said tubular air inlet, said injector nozzle discharging pressurized water delivered thereto as a spray to intermix with air flowing through said tubular inlet; and i. a conduit connector to said injector nozzle and said water discharge in said reservoir.

* * * * *